(12) United States Patent
Saitoh (10) Patent No.: US 9,912,854 B2
(45) Date of Patent: Mar. 6, 2018

(54) IMAGING MODULE AND IMAGING APPARATUS

(71) Applicant: Tetsuro Saitoh, Miyagi (JP)

(72) Inventor: Tetsuro Saitoh, Miyagi (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/313,116

(22) PCT Filed: Jun. 1, 2015

(86) PCT No.: PCT/JP2015/066421
§ 371 (c)(1),
(2) Date: Nov. 22, 2016

(87) PCT Pub. No.: WO2015/186840
PCT Pub. Date: Dec. 10, 2015

(65) Prior Publication Data
US 2017/0195538 A1    Jul. 6, 2017

(30) Foreign Application Priority Data

Jun. 5, 2014 (JP) ................................. 2014-117041

(51) Int. Cl.
*H04N 5/225* (2006.01)
*G02F 1/1333* (2006.01)
(Continued)

(52) U.S. Cl.
CPC ..... *H04N 5/2259* (2013.01); *G02F 1/133308* (2013.01); *G02F 1/133382* (2013.01);
(Continued)

(58) Field of Classification Search
CPC .. H04N 5/2259; H04N 5/2254; H04N 5/7416; H04N 5/74; H04N 17/002;
(Continued)

(56) References Cited

U.S. PATENT DOCUMENTS 4,897,846 A    1/1990 Yoshida et al.
5,631,474 A    5/1997 Saitoh
(Continued)

FOREIGN PATENT DOCUMENTS

DE    10 2011 110 167 A1    2/2013
EP         1 720 340 A1    11/2006
(Continued)

OTHER PUBLICATIONS

Extended European Search Report issued Mar. 2, 2017 in Patent Application No. 15802612.0.
(Continued)

*Primary Examiner* — Pritham Prabhakher
(74) *Attorney, Agent, or Firm* — Oblon, McClelland, Maier & Neustadt, L.L.P.

(57) ABSTRACT

An imaging module includes a spatial light modulator that spatially modulates an incident light flux to emit a modulated light flux, an imaging element that obtains the modulated light flux by the spatial light modulator as image information, and an adjuster that adjusts a space between an imaging surface of the imaging element and the spatial light modulator, wherein the adjuster operates to reduce the space between the imaging surface and the spatial light modulator in response to a temperature rise.

10 Claims, 8 Drawing Sheets

(51) Int. Cl.
*H04N 17/00* (2006.01)
*G06T 7/521* (2017.01)

(52) U.S. Cl.
CPC ......... *H04N 5/2254* (2013.01); *H04N 17/002* (2013.01); *G06T 7/521* (2017.01)

(58) Field of Classification Search
CPC .... H04N 1/02885; H04N 9/31; H04N 9/3102; H04N 9/3105; H04N 9/3108; H04N 9/312; H04N 9/3126; H04N 9/3132; H04N 9/3141; H04N 9/3144; H04N 9/315; H04N 9/317; H04N 9/3176; H04N 9/3185; H04N 9/3197; G02F 1/133382; G02F 1/133308; G02F 2203/12; G06T 7/521; H04L 9/065; G03B 21/00; G03B 21/005; G02B 27/1026; G02B 27/1046
USPC ........................................................ 348/374
See application file for complete search history.

(56) References Cited

U.S. PATENT DOCUMENTS

| | | | |
|---|---|---|---|
| 6,476,551 | B1 | 11/2002 | Osawa et al. |
| 7,554,714 | B2 * | 6/2009 | Chui ........................ G01J 3/26 356/450 |
| 7,792,423 | B2 | 9/2010 | Raskar et al. |
| 7,927,654 | B2 * | 4/2011 | Hagood ............... G02B 6/0043 427/164 |
| 7,965,936 | B2 | 6/2011 | Raskar et al. |
| 8,102,747 | B2 * | 1/2012 | Sun ...................... G11B 7/1378 369/103 |
| 8,576,206 | B2 * | 11/2013 | Matsumoto .......... G09G 3/2092 345/100 |
| 9,036,080 | B2 * | 5/2015 | Miyawaki ............ H04N 5/2254 348/335 |
| 9,223,159 | B2 * | 12/2015 | Takiguchi .............. G02B 26/06 |
| 9,304,358 | B2 * | 4/2016 | Ide ........................ G02F 1/1339 |
| 2001/0012047 | A1 | 8/2001 | Osawa et al. |
| 2002/0051052 | A1 | 5/2002 | Masuda et al. |
| 2005/0243396 | A1 | 11/2005 | Fujii et al. |
| 2006/0132883 | A1 | 6/2006 | Saitoh |
| 2008/0225363 | A1 | 9/2008 | Saitoh et al. |
| 2009/0225384 | A1 | 9/2009 | Eiji et al. |
| 2010/0232833 | A1 | 9/2010 | Fujii et al. |
| 2010/0295836 | A1 * | 11/2010 | Matsumoto .......... G09G 3/2092 345/211 |
| 2011/0249544 | A1 * | 10/2011 | Sun ...................... G11B 7/0917 369/103 |
| 2011/0285963 | A1 * | 11/2011 | Kurtz .................... G02B 27/18 353/8 |
| 2011/0292505 | A1 * | 12/2011 | Kurtz .................... G02B 7/028 359/489.14 |
| 2013/0201297 | A1 | 8/2013 | Jiang et al. |
| 2014/0036180 | A1 * | 2/2014 | Takiguchi .............. G02B 26/06 349/33 |

FOREIGN PATENT DOCUMENTS

| | | |
|---|---|---|
| JP | 5-122709 | 5/1993 |
| JP | 2004-72444 | 3/2004 |
| JP | 2005-252918 | 9/2005 |
| JP | 2008-72305 | 3/2008 |
| JP | 5328165 | 8/2013 |
| JP | 2015-133594 | 7/2015 |
| WO | WO 2012/145313 A2 | 10/2012 |
| WO | WO 2015/105199 A1 | 7/2015 |

OTHER PUBLICATIONS

International Search Report dated Aug. 25, 2015 in PCT/JP2015/066421 filed Jun. 1, 2015.

A.Levin, R.Fergus, F.Durand and W.Freeman, "Image and Depth from a Conventional Camera with a Coded Aperture" (SIGGRAPH 2007), United States 2007.

C.Zhou, Stephen Lin and S.Nayar,"Coded Aperture Pairs for Depth from Defocus" (ICCV 2009), United States 2009.

A.Veeraraghavan, R.Raskar, A.Agrawal, A. Mohan and J. Tumblin, "Dappled photography: Mask Enhanced Cameras for Heterodyned Light Fields and Coded Aperture Refocusing" (Association for Computing Machinery Trans. Graph. 26(3): 69 2007), United States 2007.

Takuya Watanabe, Hajime Nagahara, Changyin Zhou, Hiroshi Ishiguro and Shree K.Nayar, "Programmable Aperture Camera" with a partial English translation, 2010.

* cited by examiner

IMAGING MODULE AND IMAGING APPARATUS

PRIORITY CLAIM

The present application is based on and claims priority to Japanese patent application No. 2014-117041, filed Jun. 5, 2014, the disclosure of which is hereby incorporated by reference herein in its entirety.

TECHNICAL FIELD

The present invention relates to an imaging module and an imaging apparatus using a spatial light modulator.

BACKGROUND ART

An imaging apparatus represented by a camera has been used for many systems, for example, a photographing system, an industrial measurement and object recognition system, and a vehicle hazard detection and security monitoring system. The imaging apparatus for use in these systems is required to obtain not only a subject image but also spatial information such as a distance and an eyesight direction.

A technique that can obtain such spatial information is taught by, for example, Patent Literature 1 and Non Patent Literatures 1 to 3. These literatures describe a technique that obtains information regarding an incident angle and a space of a light flux incident on an imaging element by executing a decoding process based on Fourier transform with the imaging element and a coded aperture pattern.

Another known technique uses an active spatial light modulator, that is, reconstructible into the coded aperture pattern, to decode images captured with different types of coded patterns for the purpose of improving image quality.

In such a technique, the spatial light modulator and the imaging element such as a CCD image sensor and a CMOS image sensor are arranged adjacent to each other to achieve a highly accurate process (for example, Patent Literature 1).

CITATION LIST

Patent Literature

[PTL 1] JP 5328165B

Non Patent Literature

[NPL 1] A. Levin, R. Fergus, F. Durand and W. Freeman, "Image and Depth from a Conventional Camera with a Coded Aperture" (SIGGRAPH 2007), United States 2007

[NPL 2] C. Zhou, Stephen Lin and S. Nayar, "Coded Aperture Pairs for Depth from Defocus" (ICCV 2009), United States, 2009

[NPL 3] A. Veeraraghavan, R. Raskar, A. Agrawal, "Dappled Photography: Mask Enhanced Cameras for Heterodyned Light Fields and Coded Aperture Refocusing" (Association for Computing Machinery Trans. Graph. 26 (3): 69 2007), United States 2007

SUMMARY OF INVENTION

Technical Problem

However, when the spatial light modulator and the imaging element are arranged adjacent to each other, a positional offset slightly occurs between a light-receiving portion of the imaging element and an opening portion of the spatial light modulator. Such a positional offset significantly affects measurement errors.

In particular, due to downsizing of the imaging element and an increase in resolution of the imaging element, the positional offset occurs between the light-receiving portion of the imaging element and the opening portion of the spatial light modulator by thermal expansion of a member caused by a change in environmental temperature of the imaging apparatus. Such a positional offset significantly affects measurement errors.

The present invention has been made in view of the above circumstances and aims to provide an imaging module to achieve a highly accurate process by reducing a decrease in accuracy caused by a change in environmental temperature.

Solution to Problem

To achieve the above object, an aspect of the present invention provides an imaging module including a spatial light modulator that spatially modulates an incident light flux to emit a modulated light flux, an imaging element that obtains the modulated light flux by the spatial light modulator as image information, and an adjuster that adjusts a space between an imaging surface of the imaging element and the spatial light modulator, wherein the adjuster operates to reduce the space between the imaging surface and the spatial light modulator in response to a temperature rise.

Advantageous Effects of Invention

According to the present invention, an imaging module that reduces a decrease in accuracy caused by a change in environmental temperature to achieve a highly accurate process can be provided.

DESCRIPTION OF EMBODIMENT

Figure 1A:
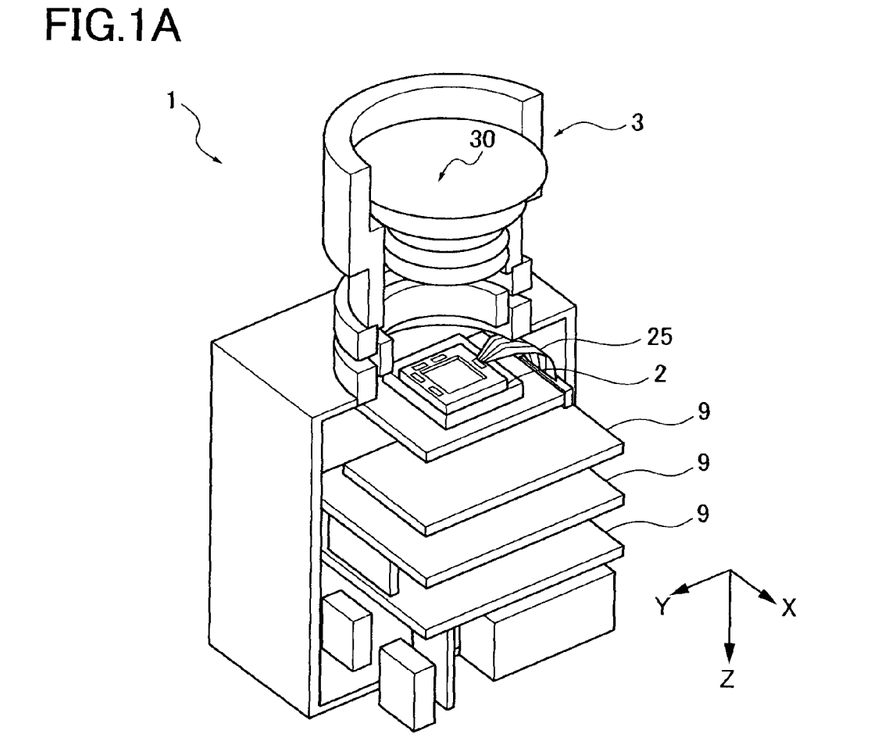
FIGS. 1A, 1B, and 1C are views showing an entire configuration of an imaging module and an imaging apparatus according to embodiments of the present invention.

An imaging apparatus 1 illustrated in FIG. 1A according to embodiments includes an imaging module 2 that obtains an image, an imaging forming optical system 3 that forms an image with an incident light flux to be emitted to the imaging module 2, and a controller 9 as a process circuit that executes a decoding process to a captured image.

In the following description, an optical axis direction of the incident light flux is represented as a Z-axis direction, and directions vertical to the Z-axis direction are represented as a Y-axis direction and an X-axis direction respectively, as illustrated by arrows in FIGS. 1A, 1B, and 1C.

Figure 1B:
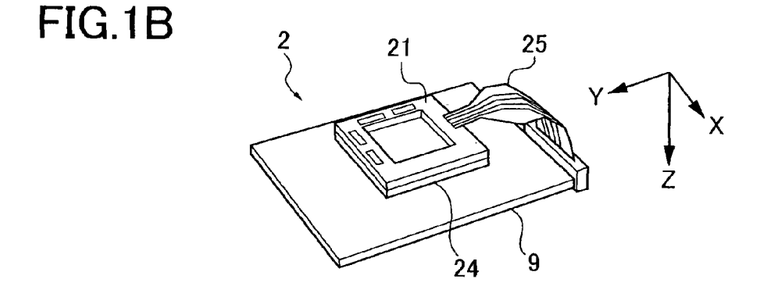
Figure 1C:
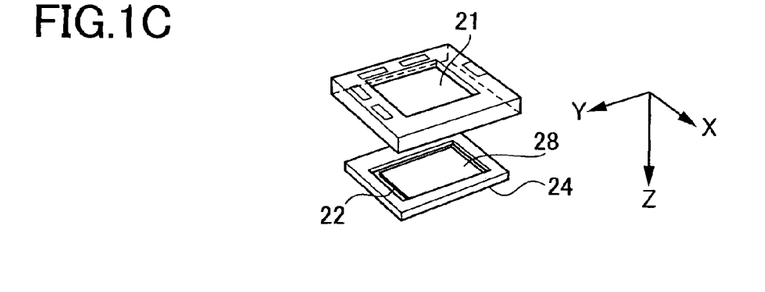

As illustrated in FIGS. 1B and 1C, the imaging module 2 includes a spatial light modulator 21 that spatially modulates the incident light flux and emits the modulated incident light flux and an imaging element 22 that obtains the spatially modulated light flux as image information.

Figure 2:
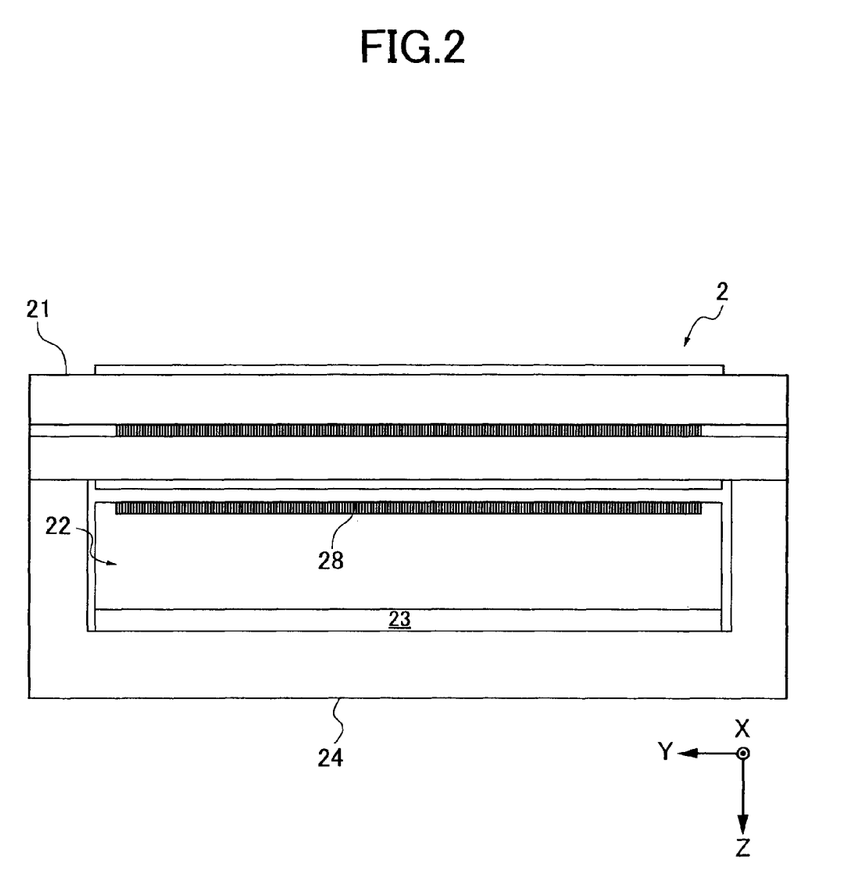
FIG. 2 is a view showing a configuration of an imaging module according to a first embodiment of the present invention.

As illustrated in FIG. 2, the imaging module 2 also includes an adjuster 23 that adjusts a space between the imaging element 22 and the spatial light modulator 21 and a fixed portion 24 that fixes the imaging element 22 for protection.

The imaging module 2 further includes a wiring 25 that electrically connects the spatial light modulator 21 and the controller 9.

The spatial light modulator 21, which is made of a transmissive liquid crystal device, spatially modulates the incident light flux by forming a corded aperture pattern, i.e., a mosaic pattern that is formed by changing a transmittance in each position with the controller 9.

The spatial light modulator 21 is mainly made of a quartz board and thus has a coefficient of thermal expansion of $5\times10^{-7}$/K of the quartz board.

The imaging element 22, which is made of an image sensor using a CCD as a photosensor array, obtains the light flux spatially modulated by the spatial light modulator 21 as image information. A photosensor array 28 as an imaging surface, which is made of a plurality of photodiodes as light receiving elements, is disposed on the imaging element 22. The imaging element 22 converts information of the light flux incident on the imaging surface, for example, an intensity of the light flux into electric signals. In this embodiment, the image sensor uses a CCD, but any image sensor, for example, a Complementary Metal-Oxide Semiconductor (CMOS) sensor may be used as long as it can obtain image information.

The imaging element 22 is located below the spatial light modulator 21 to have the photosensor array 28 face the spatial light modulator 21.

The imaging element 22 is mainly made of a single-crystal silicon board, and thus has a coefficient of thermal expansion of $2.4\times10^{-6}$/K of the single-crystal silicon board.

The adjuster 23 abuts on the imaging element 22 and is disposed on the opposite side of the spatial light modulator 21 across the photosensor array 28. The adjuster 23 is made of a polyimide sheet having a coefficient of thermal expansion of $6\times10^{-5}$/K. The adjuster 23 is located below the imaging element 22 to abut on the lower side of the imaging element 22.

The fixed portion 24 is made of a ceramic concaved protection member as an exterior package that fixes the imaging element 22 to be protected. The imaging element 22 is held in a bottom surface of the concaved protection member.

The fixed portion 24 is mainly made from alumina, and thus has a coefficient of thermal expansion of $7\times10^{-6}$/K of the alumina.

As illustrated in FIG. 1A, the imaging forming optical system 3 includes an imaging lens group 30 having at least one lens. The imaging lens group 30 is disposed to form an image on the imaging element 22.

The imaging forming optical system 3 is disposed to form an image on the imaging element 22 with the light flux incident on the imaging apparatus 1. More specifically, the imaging forming optical system 3 is located above the imaging module 2 to focus on the imaging element 22.

The controller 9 operates as a spatial light modulation pattern generator, a decoding processor that converts a light flux having transmitted through the spatial light modulator 21 into image information, and an image property analyzer that separates a field angle based on the obtained image information to obtain an image having spatial information such as a distance and a direction.

The light flux incident on the imaging apparatus 1 is deflected by the imaging lens group 30 to form an image on the imaging element 22.

The light flux having transmitted through the imaging forming optical system 3 is incident on the spatial light modulator 21, and is spatially modulated by the spatial light modulator 21.

The controller 9 as an element driver controls a transmittance distribution of the spatial light modulator 21 by using a spatial transmittance distribution in which a plurality of sine waves of different periods are superimposed.

Hereinafter, a minimum unit capable of controlling the transmittance distribution is referred to as a cell.

The spatial light modulator 21 forms the coded aperture pattern by changing a transmittance in each cell in response to the electric signals, namely, periodical modulation signals, from the controller 9 as the element driver.

More specifically, the spatial light modulator 21 spatially modulates the light flux passing through the spatial light modulator 21 by periodically changing the transmittance of each cell.

The controller 9 thus operates as the spatial light modulation pattern generator.

When forming the corded aperture pattern by using such a spatial transmittance distribution, a distribution of a finite spatial frequency spectrum band of an image is copied in a form of convolution in the spatial frequency position corresponding to the period of the sine waves, namely, on the Fourier transformed horizontal axis.

The distribution of the spatial frequency spectrum of a subject is copied on the axis of the spatial frequency by the number of sine wave cycles. The filed angle can be separated by the mixture of the frequency information of an angular component depending on the frequency of the sine wave.

In the present embodiment, distance information relative to a subject can be obtained by optimizing a distance resolution for a targeted subject in an image.

A method for obtaining such spatial information will be described with reference to an example for obtaining distance information.

However, a detailed description of a method for calculating disparity information from the filed-angle separated images will be appropriately omitted.

At first, the controller 9 as the spatial light modulation pattern generator generates a spatial light modulation pattern. The controller 9 obtains an image by using the generated spatial light modulation pattern, and extracts field-angle separated information.

Next, the controller 9 as a distance resolution determiner and the image property analyzer analyzes the field-angle separated information, and calculates distance information on a local position of the targeted subject in the image. The controller 9 as the distance resolution determiner determines whether the obtained image has a predetermined resolution from the distance information calculated as described above.

When the controller 9 determines that the resolution of the image is insufficient, the controller 9 as the spatial light modulation pattern generator recalculates the period of the sine wave constituting the spatial light modulation pattern.

The controller 9 changes the filed-angle separated resolution based on the calculated spatial light modulation pattern to regenerate the spatial light modulation pattern, and thus obtains a new image.

The controller 9 optimizes the distance resolution by forming such a feedback loop, and finally obtains a distance image appropriate to the targeted subject.

For obtaining the distance image of an object with the imaging module 2, the spatial light modulator 21 and the photosensor array 28 of the imaging element 22 are arranged adjacent to each other to achieve a highly accurate process.

However, when the spatial light modulator 21 and the imaging element 22 are arranged adjacent to each other, a positional offset slightly occurs between the photosensor array 28 as a light receiver of the imaging element 22 and an opening portion of the spatial light modulator 21. Such a positional offset significantly affects measurement errors.

This will be described in detail with reference to FIGS. 3A and 3B.

Figure 3A:
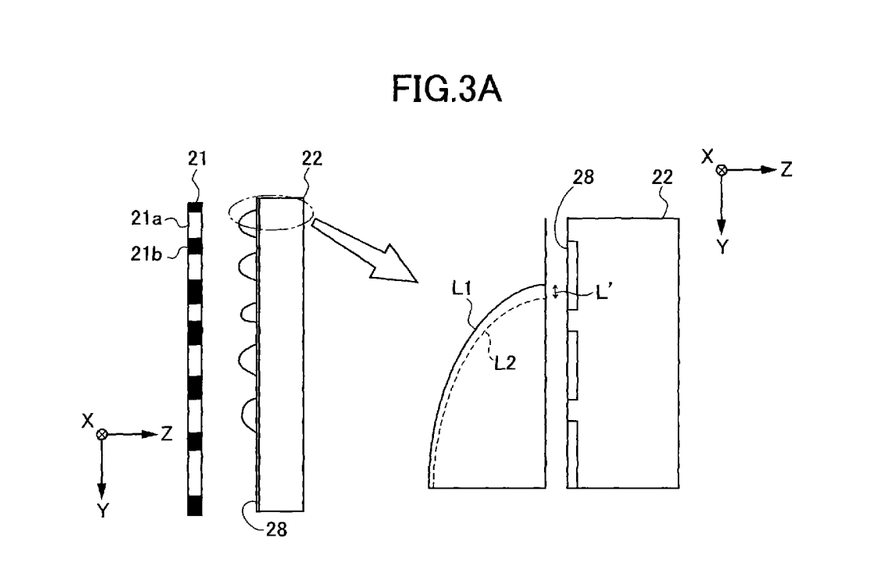
FIGS. 3A and 3B are schematic views showing a light-receiving operation of the imaging module illustrated in FIG. 2.

In FIG. 3A, the spatial light modulation pattern of the spatial light modulator 21 includes high transmittance opening portions 21a shown by white portions and low transmittance closed portions 21b shown by black portions.

FIG. 3A schematically shows a projection pattern L in which the light fluxes transmitted through the opening portions 21a of the spatial light modulator 21 are measured on the photosensor array 28. The projection pattern L increases in height on the Z axis in response to an intensity of the light flux.

Such a pattern diagram shows that in an ideal condition the spatial light modulator 21 and the imaging element 22 have no difference in coefficient of thermal expansion, so that a typical projection pattern L1 is detected.

However, the spatial light modulator 21 and the imaging element 22 actually have a difference in coefficient of thermal expansion caused by exhaust heat of the imaging apparatus 1, an environmental temperature for the imaging apparatus 1, or absorption of the light flux transmitted through the spatial light modulator 21.

By use of the spatial light modulator 21 made of the quartz board and the imaging element 22 made of the single-crystal silicon board in a full size of 36 mm×24 mm, under an environmental temperature change of 30° C., a positional offset of about 1 µm occurs between the spatial light modulator 21 and the imaging element 22 in the Y-axis direction.

Their positional offset changes because the coefficient of thermal expansion of the imaging element 22 is larger than that of the spatial light modulator 21. Consequently, the displacement of the imaging element 22 in the Y-axis direction caused by a temperature change is larger than that of the spatial light modulator 21.

An actual projection pattern L is detected as an expanded projection pattern L2 by the difference in coefficient of thermal expansion. A pattern difference L' between the projection pattern L2 and the projection pattern L1 is about 1 µm.

Since the imaging element 22 is a high-accuracy, high-resolution advanced element, and the size of one pixel arranged in the photosensor array 28 is about 5 µm, the positional offset of about 1 µm causes an error of about 20% in distance measurement.

The imaging module 2 includes the adjuster 23 that adjusts the space between the photosensor array 28 and the spatial light modulator 21 to reduce the positional offset between the spatial light modulator 21 and the imaging element 22 caused by the change in environmental temperature, and thus to achieve a highly accurate process with less error.

The adjuster 23 operates to reduce the space between the photosensor array 28 and the spatial light modulator 21 in response to a temperature rise.

The detailed operation of the adjuster 23 will be described below.

Figure 3B:
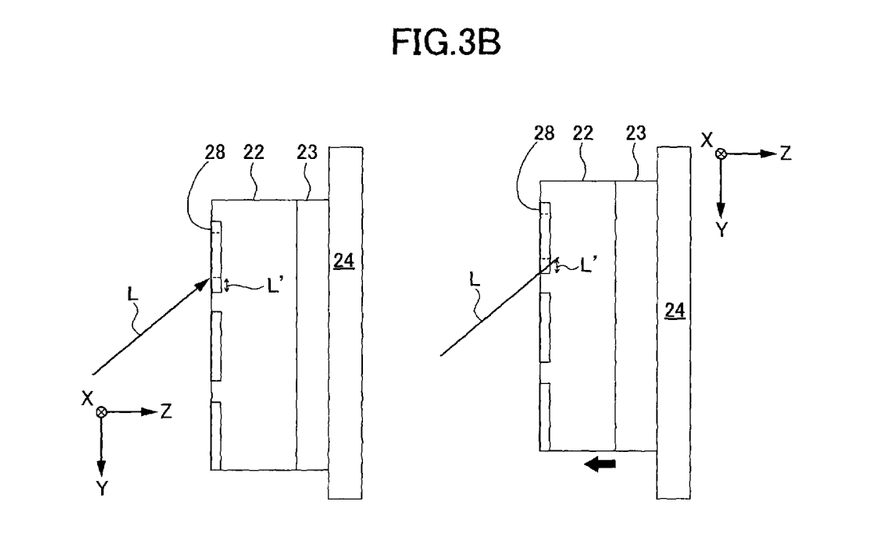

FIG. 3B is an enlarged view of the expanded imaging element 22 by the above-described thermal expansion. Since the coefficient of thermal expansion of the imaging element 22 is significantly larger than that of the spatial light modulator 21, the projection pattern L of the light flux from the spatial light modulator 21 remains almost unchanged in relative terms. Thus, it can be approximately considered that the photosensor array 28 is expanded on the imaging element 22 in the Y-axis direction.

When the imaging element 22 expands, the light flux is incident on a position of the imaging element 22 shifted from the initial position when the imaging element 22 does not expand, causing the pattern difference L'.

The adjuster 23 expands in the Z-axis direction to move the position of the photosensor array 28 in the Z-axis direction toward the spatial light modulator 21, thereby reducing the positional offset of the light fluxes incident on the photosensor array 28 from that in case of no adjuster 23 provided.

With such a configuration, along with an increase in space between the fixed portion 24 and the imaging element 22 by the thermal expansion of the adjuster 23, the space between the photosensor array 28 and the spatial light modulator 21 reduces. The positional offset of the light fluxes incident on the photosensor array 28 can be thereby reduced to achieve a highly accurate process.

The adjuster 23 abuts on the imaging element 22, and is disposed on the opposite side of the spatial light modulator 21 across the photosensor array 28. The coefficient of thermal expansion of the adjuster 23 is larger than that of the spatial light modulator 21.

This can reduce the space between the photosensor array 28 and the spatial light modulator 21 even when the spatial light modulator 21 expands in the Z-axis direction. The positional offset of the light fluxes incident on the photosensor array 28 can be thereby reduced to reduce a decrease in accuracy and to achieve a highly accurate process.

Further, the space between the photosensor array 28 and the spatial light modulator 21 is adjusted without a driver. Consequently, members such as a control circuit and a power source can be omitted to conserve a space and to achieve downsizing.

Figure 4A:
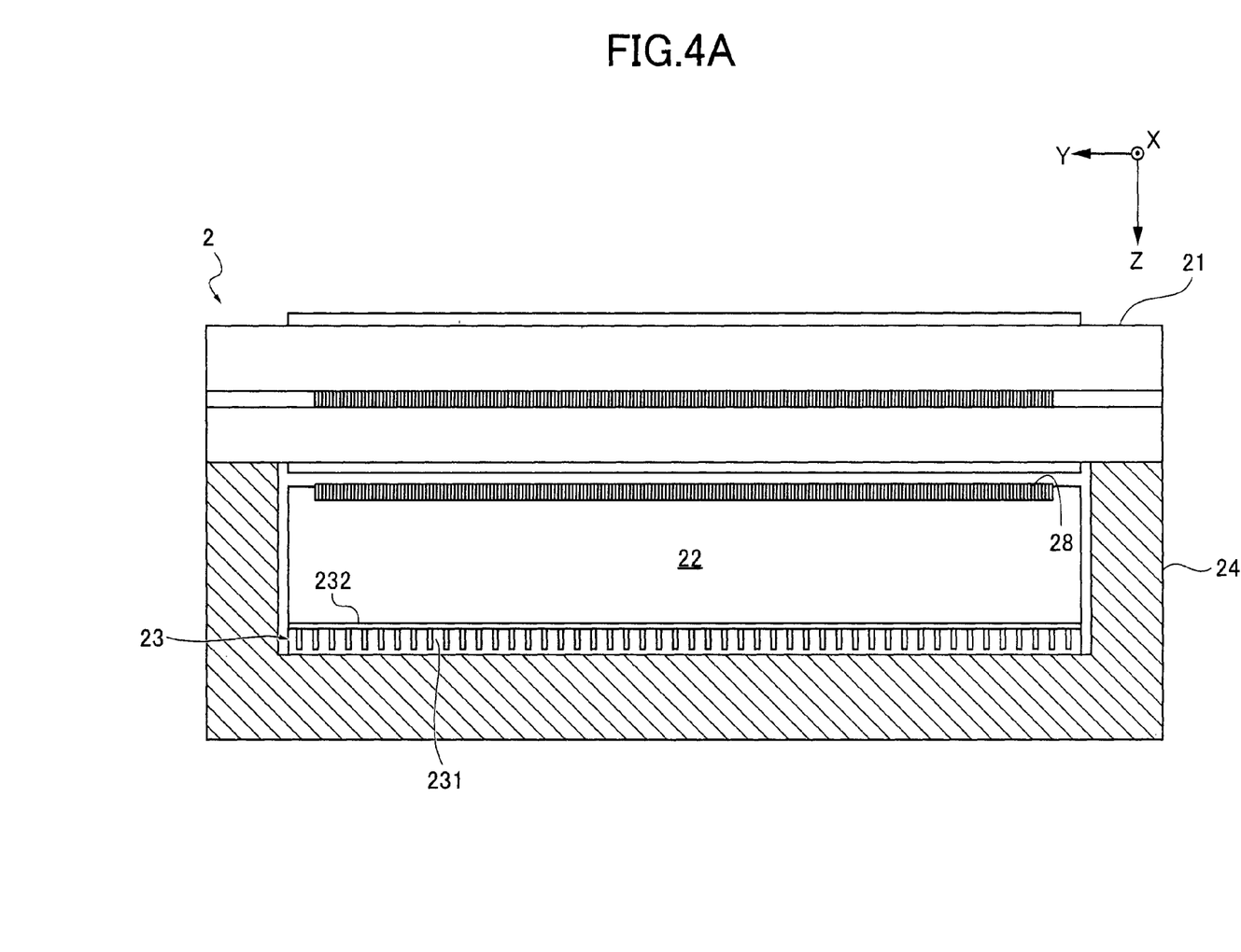
FIGS. 4A and 4B are views showing a configuration of an imaging module according to a second embodiment of the present invention.

A second embodiment of the present invention will be described with reference to FIGS. 4A, 4B, and 5.

According to the second embodiment of the present invention, the adjuster 23 includes a heat sink 231 having columnar projections formed on a plate-like base and a buffer 232 disposed between the heat sink 231 and the imaging element 22.

Figure 4B:
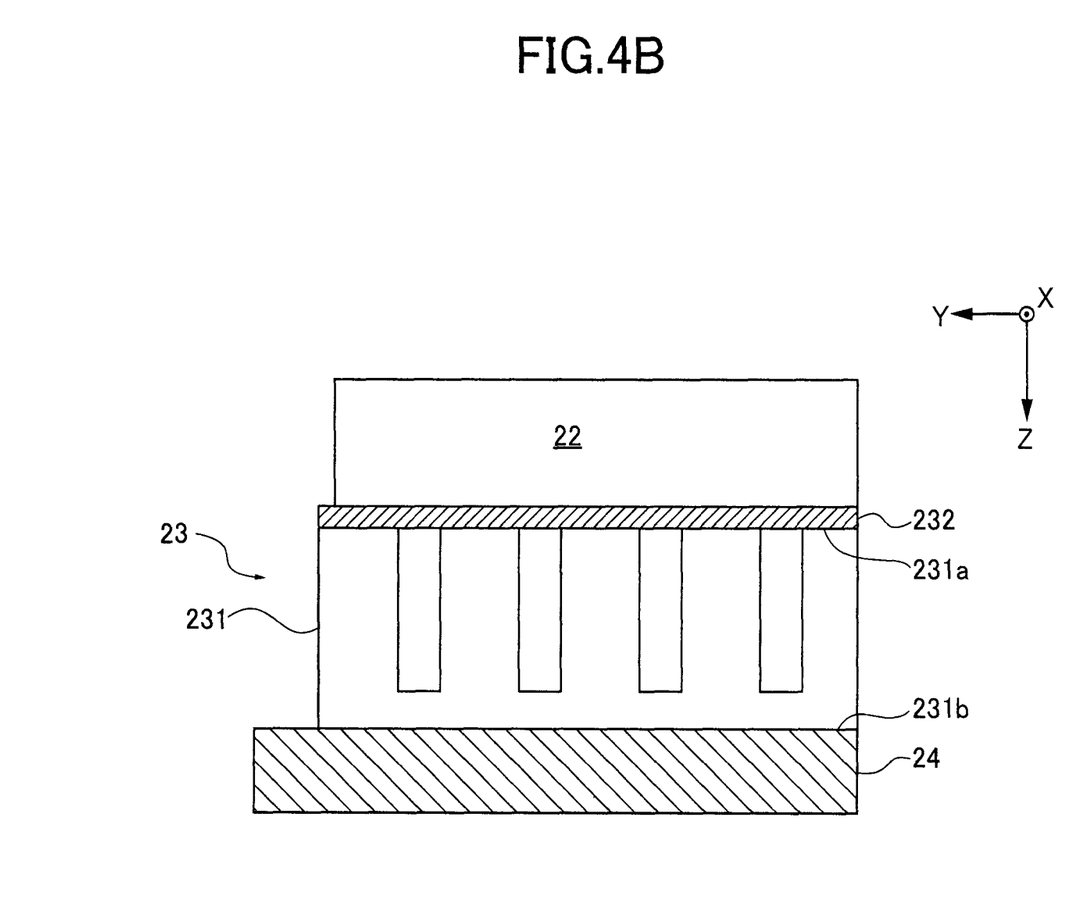

The heat sink 231 is made from aluminum and has a bonded surface 231a as a contact surface with the buffer 232 and a fixed surface 231b as a contact surface with the fixed portion 24, as illustrated in FIG. 4B. The area of the bonded surface 231a is smaller than that of the fixed surface 231b.

The heat sink 231 is mainly made from aluminum, and thus, has a coefficient of thermal expansion of $2\times10^{-5}$/K of the aluminum.

The use of the metal such as aluminum having a large coefficient of thermal expansion for the adjuster 23 reduces the space between the photosensor array 28 and the spatial light modulator 21, and reduces a decrease in accuracy to achieve a highly accurate process while improving the stiffness of the adjuster 23 and the mechanical positional accuracy.

The heat sink 231 effectively releases heat in the imaging element 22, controls the thermal expansion in the Y-axis direction, and thus, reduces a decrease in accuracy to achieve a highly accurate process.

The buffer 232 is made of a kovar plate having a coefficient of thermal expansion close to that of the imaging element 22.

The buffer 232 is mainly made from kovar, and thus, has a coefficient of thermal expansion of $5 \times 10^{-6}$/K of the kovar.

The buffer 232 has a stress relaxation function that relaxes a stress caused by a difference in coefficient of thermal expansion between the heat sink 231 and the imaging element 22. That is, the buffer 232 controls the displacement of the heat sink 231 in the Y-axis direction by the thermal expansion.

Figure 5:
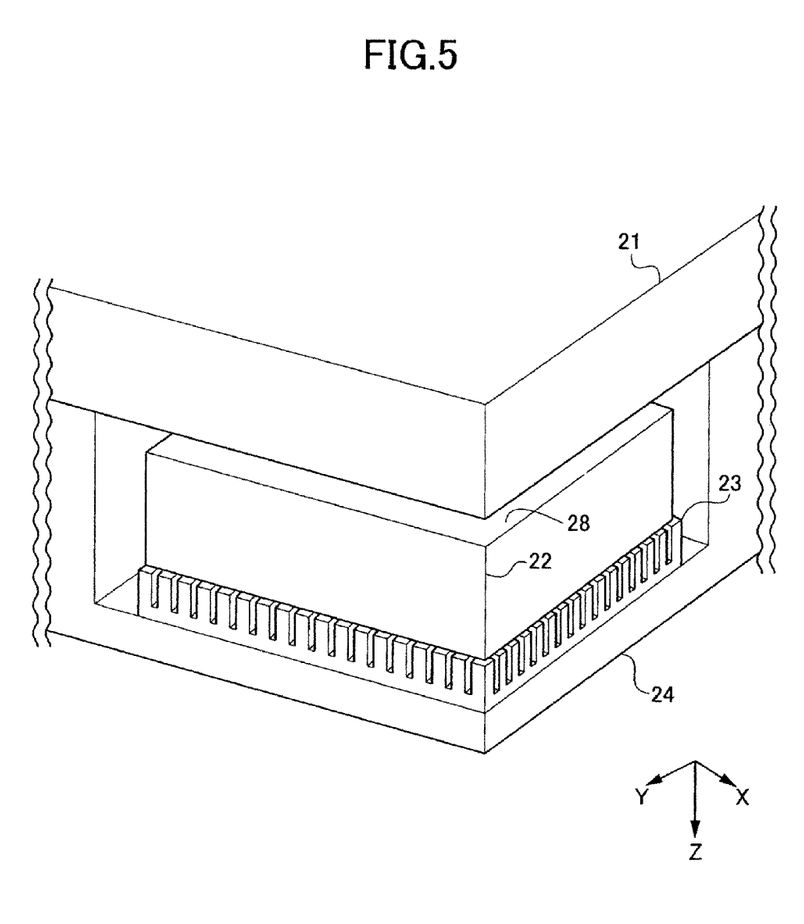
FIG. 5 is a perspective view showing a configuration of the imaging module illustrated in FIGS. 4A and 4B.

The adjuster 23 supports the imaging element 22 not to prevent the displacement of the imaging element 22 in the Z-axis direction by the thermal expansion, and to reduce the displacement of the imaging element 22 in the Y-axis, direction by the thermal expansion, as illustrated in FIG. 5.

This configuration reduces the positional offset of the photosensor array 28 in the Y-axis direction to reduce a decrease in accuracy and to achieve a highly accurate process while reducing the space between the photosensor array 28 and the spatial light modulator 21.

The reset of the configuration of the second embodiment is similar to that of the first embodiment, and thus, it is omitted.

Figure 6:
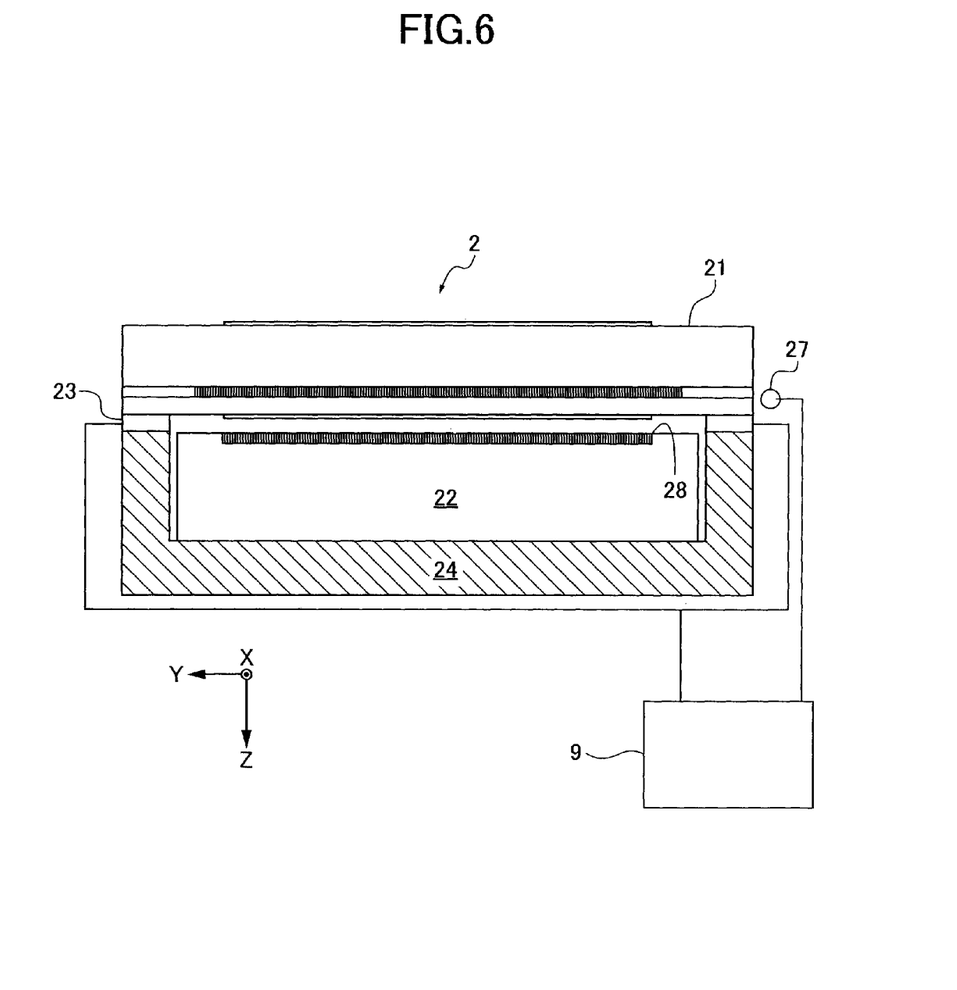
FIG. 6 is a view showing a configuration of an imaging module according to a third embodiment of the present invention.

A third embodiment of the present invention will be described with reference to FIG. 6.

In the third embodiment, the imaging module 2 includes a temperature sensor 27 as a temperature detector that measures a temperature of the imaging module 2, the adjuster 23, and the controller 9 that applies voltage to the adjuster 23 in accordance with a temperature detected by the temperature sensor 27. The adjuster 23 in the third embodiment is made of a laminated type piezoelectric element disposed between the spatial light modulator 21 and the fixed portion 24. Note that any adjuster, for example, a driving member such as a motor and an actuator can be used as long as it adjusts the space between the spatial light modulator 21 and the photosensor array 28 based on control signals such as voltage. An ultrasonic linear displacement motor may be also used.

In the third embodiment, the imaging element 22 is fixed to the fixed portion 24.

The spatial light modulator 21 is supported by the fixed portion 24 to be movable in the Z-axis direction by the adjuster 23.

The controller 9, which is connected to the temperature sensor 27 and the adjuster 23, operates as a space controller that controls the movement amount of the adjuster 23 in the Z-axis direction by applying voltage to the adjuster 23 in accordance with an environmental temperature detected by the temperature sensor 27.

The operation of the adjuster 23 in the third embodiment will be described. Upon a rise in the environmental temperature of the imaging module 2, the controller 9 as the space controller applies voltage to the adjuster 23 in accordance with a temperature detected by the temperature sensor 27.

After the voltage is applied to the adjuster 23, the adjuster 23 expands or contracts in the Z-axis direction by a value corresponding to the applied voltage. The adjuster 23 is disposed to contract in the Z-axis direction at a rise in environmental temperature of the imaging module 2. That is, the space between the spatial light modulator 21 and the fixed portion 24 reduces in response to a temperature rise. The contraction amount of the adjuster 23, which is also the operation amount of the adjuster 23, is adjusted to maintain an appropriate space between the photosensor array 28 and the spatial light modulator 21 at a preset temperature.

The contraction of the adjuster 23 displaces the spatial light modulator 21 in the Z-axis direction to adjust the space between the spatial light modulator 21 and the photosensor array 28.

Thus, the space between the photosensor array 28 and the spatial light modulator 21 reduces. The offset caused by a relative change in size between the imaging element 22 and the spatial light modulator 21, namely, the positional offset of the light fluxes incident on the photosensor array 28 can be thereby reduced to achieve a highly accurate process.

With this, the controller 9 sets the space between the photosensor array 28 and the spatial light modulator 21 in response to a change in environmental temperature of the imaging module 2, and thus reduces a decrease in accuracy to achieve a highly accurate process.

Note that the rest of the configuration in the third embodiment is similar to that in the first embodiment, and thus the description is omitted.

A fourth embodiment of the present invention will be described with reference to FIG. 7.

Figure 7:
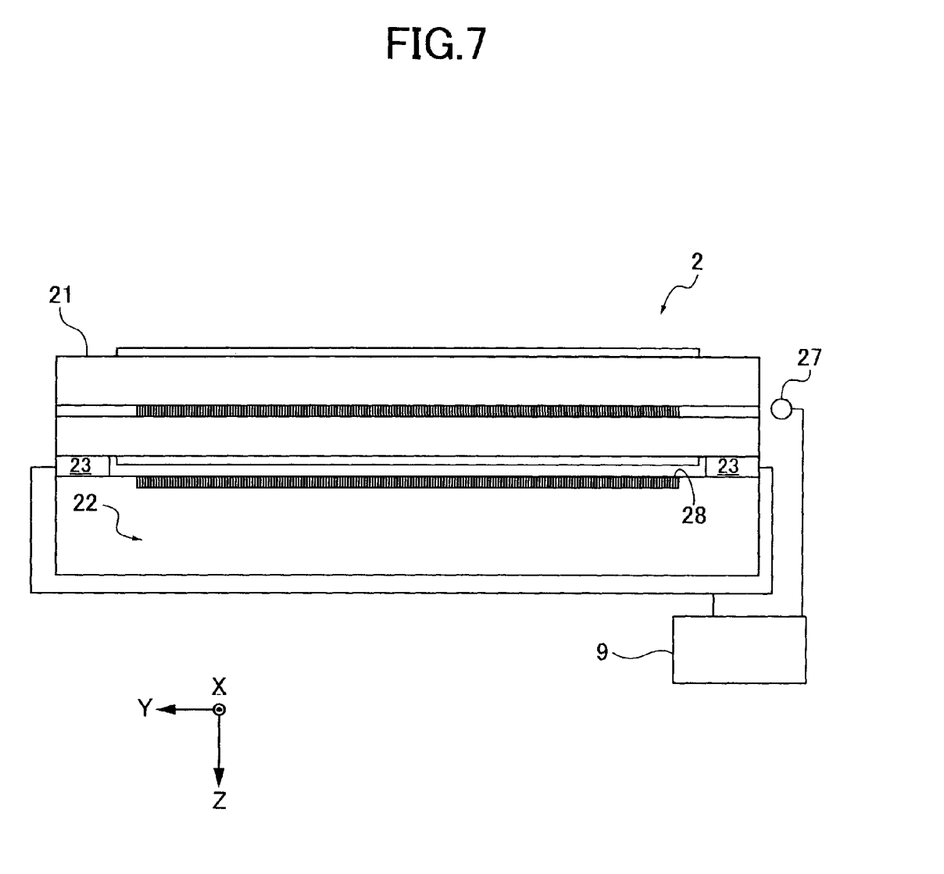
FIG. 7 is a view showing a configuration of an imaging module according to a fourth embodiment of the present invention.

In the fourth embodiment, the adjuster 23 is disposed between the imaging element 22 and the spatial light modulator 21, as illustrated in FIG. 7. The imaging element 22 and the spatial light modulator 21 are connected through the adjuster 23.

Any adjuster can be used in this embodiment as long as it is made of a piezoelectric element. The adjuster 23 described in the third embodiment may be used.

In the fourth embodiment, the adjuster 23 adjusts the space between the photosensor array 28 and the spatial light modulator 21 according to the temperature of the imaging module 2 measured by the temperature sensor 27 by adjusting the space between the imaging element 22 and the spatial light modulator 21.

With this, the space between the photosensor array 28 and the spatial light modulator 21 reduces. The offset caused by a relative change in size between the imaging element 22 and the spatial light modulator 21, namely, the positional offset of the light fluxes incident on the photosensor array 28 can be thereby reduced to reduce a decrease in accuracy and to achieve a highly accurate process.

With this, the controller 9 sets the space between the photosensor array 28 and the spatial light modulator 21 in response to a change in the environmental temperature of the imaging module 2, and thus reduces a decrease in accuracy to achieve a highly accurate process.

Further, with this configuration, the fixed portion 24 is omitted, and the imaging module 2 is thereby downsized.

Note that the rest of the configuration in the fourth embodiments is similar to that in the third embodiment, and thus the description is omitted.

Although the embodiments of the present invention have been described above, the present invention is not limited thereto. It should be appreciated that variations may be made in the embodiments described by persons skilled in the art without departing from the scope of the present invention.

For example, in the first to fourth embodiments, the imaging apparatus 1 may be various types of imaging apparatus such as a compact digital camera and a small camera equipped with a portable device.

In the first to fourth embodiments, the controller 9 may be any controller such as a controller that is provided inside the imaging module 2 and a controller that is provided separately from the imaging module 2.

In the first to fourth embodiments, the spatial light modulator 21 is made of the transmissive liquid crystal device, but it may be made of a transmissive spatial light modulator using an electrowetting effect.

In the first embodiment, the adjuster 23 is made of the polyimide sheet, but the material of the adjuster 23 is not limited thereto. Any material may be used for the adjuster 23 as long as it has a coefficient of thermal expansion in the Z-axis direction larger than that of the fixed portion 24.

The effects described in the above embodiments are only the most suitable effects of the present invention. However, the effects of the present invention are not limited to the effects described in the above embodiments.

The invention claimed is:

1. An imaging module comprising:
a spatial light modulator that spatially modulates an incident light flux to emit a modulated light flux;
an imaging element that obtains the modulated light flux by the spatial light modulator as image information; and
an adjuster that adjusts a space between an imaging surface of the imaging element and the spatial light modulator, wherein
the adjuster operates to reduce the space between the imaging surface and the spatial light modulator in response to a temperature rise;
the adjuster abuts on the imaging element and is disposed on an opposite side of the spatial light modulator across the imaging surface;
the adjuster has a coefficient of thermal expansion larger than that of the spatial light modulator; and
the imaging element and the spatial light modulator are supported to be displaceable in an optical axis direction of the light flux, and to reduce displacement in a direction vertical to the optical axis direction.

2. The imaging module according to claim 1, further comprising a space controller that sets the space between the imaging surface and the spatial light modulator by controlling an operation amount of the adjuster.

3. The imaging module according to claim 2, further comprising a temperature detector that measures a temperature in the imaging module, wherein
the space controller sets the space between the imaging surface and the spatial light modulator according to the temperature measured by the temperature detector.

4. An imaging apparatus comprising:
the imaging module according to claim 1; and
an imaging forming optical system that forms an image on the imaging element.

5. An imaging module comprising:
a spatial light modulator that spatially modulates an incident light flux to emit a modulated light flux;
an imaging element that obtains the modulated light flux by the spatial light modulator as image information; and
an adjuster that adjusts a space between an imaging surface of the imaging element and the spatial light modulator, wherein
the adjuster operates to reduce the space between the imaging surface and the spatial light modulator in response to a temperature rise;
the adjuster abuts on the imaging element and is disposed on an opposite side of the spatial light modulator across the imaging surface;
the adjuster has a coefficient of thermal expansion larger than that of the spatial light modulator; and
the imaging module further comprises a space controller that sets the space between the imaging surface and the spatial light modulator by controlling an operation amount of the adjuster.

6. The imaging module according to claim 5, further comprising a temperature detector that measures a temperature in the imaging module, wherein
the space controller sets the space between the imaging surface and the spatial light modulator according to the temperature measured by the temperature detector.

7. An imaging apparatus comprising:
the imaging module according to claim 5; and
an imaging forming optical system that forms an image on the imaging element.

8. An imaging module comprising:
a spatial light modulator that spatially modulates an incident light flux to emit a modulated light flux;
an imaging element that obtains the modulated light flux by the spatial light modulator as image information; and
an adjuster that adjusts a space between an imaging surface of the imaging element and the spatial light modulator, wherein
the adjuster operates to reduce the space between the imaging surface and the spatial light modulator in response to a temperature rise;
the adjuster abuts on the imaging element and is disposed on an opposite side of the spatial light modulator across the imaging surface;
the adjuster has a coefficient of thermal expansion larger than that of the spatial light modulator;
the imaging element and the spatial light modulator are supported to be displaceable in an optical axis direction of the light flux, and to reduce displacement in a direction vertical to the optical axis direction; and
the imaging module further comprises a space controller that sets the space between the imaging surface and the spatial light modulator by controlling an operation amount of the adjuster.

9. The imaging module according to claim 8, further comprising a temperature detector that measures a temperature in the imaging module, wherein
the space controller sets the space between the imaging surface and the spatial light modulator according to the temperature measured by the temperature detector.

10. An imaging apparatus comprising:
the imaging module according to claim 8; and
an imaging forming optical system that forms an image on the imaging element.

* * * * *